US010078855B2

(12) United States Patent
Miller et al.

(10) Patent No.: US 10,078,855 B2
(45) Date of Patent: Sep. 18, 2018

(54) MANAGING AN EXCHANGE THAT FULFILLS NATURAL LANGUAGE TRAVEL REQUESTS

(75) Inventors: Jonathan David Miller, Toronto (CA); Harold Roy Miller, Toronto (CA); Steven Mark Seider, Toronto (CA)

(73) Assignee: Amgine Technologies (US), Inc., Austin, TX (US)

( * ) Notice: Subject to any disclaimer, the term of this patent is extended or adjusted under 35 U.S.C. 154(b) by 545 days.

(21) Appl. No.: 13/420,433

(22) Filed: Mar. 14, 2012

(65) Prior Publication Data

US 2012/0239440 A1 Sep. 20, 2012

Related U.S. Application Data

(60) Provisional application No. 61/452,633, filed on Mar. 14, 2011.

(51) Int. Cl.
*G06Q 10/02* (2012.01)
*G06Q 30/06* (2012.01)
(Continued)

(52) U.S. Cl.
CPC ......... *G06Q 30/06* (2013.01); *G06F 17/2785* (2013.01); *G06F 17/30401* (2013.01); *G06Q 10/02* (2013.01)

(58) Field of Classification Search
CPC .... G06Q 10/02; G06Q 10/025; G06Q 10/087; G06Q 30/06; G06F 17/2705;
(Continued)

(56) References Cited

U.S. PATENT DOCUMENTS 5,557,524 A 9/1996 Maki
5,797,127 A 8/1998 Walker et al.
(Continued)

FOREIGN PATENT DOCUMENTS

CA 2830228 C 8/2017
WO WO2012125742 9/2012
(Continued)

OTHER PUBLICATIONS

Goddeau, et al., Galaxy: A Human-Language Interface to On-line Travel Information, Intl. Conf. on Spoken Language Processing, Sep. 1994, pp. 707-710.*
(Continued)

*Primary Examiner* — Daniel Vetter
(74) *Attorney, Agent, or Firm* — Carr & Ferrell LLP

(57) ABSTRACT

An exchange that fulfills natural language travel requests is described herein. According to some embodiments, systems for managing an exchange that fulfills natural language travel requests may include a publishing module that receives a plurality of inventory records from a plurality of suppliers, each of the plurality of inventory records pertaining to an available offering, the offering being defined by a set of metadata attributes, and a pattern recognition artificial intelligence engine that generates equivalent phrases for the set of metadata attributes from each inventory record by applying pattern recognition artificial intelligence to the set of metadata attributes, the equivalent phrases representing possible natural language queries to which an inventory record may correspond.

15 Claims, 7 Drawing Sheets

(51) Int. Cl.
  *G06F 17/27* (2006.01)
  *G06F 17/30* (2006.01)
(58) Field of Classification Search
  CPC ............ G06F 17/30684; G06F 17/301; G06F 17/3043; G07F 17/2785; G07F 17/30401
  USPC ....................................... 705/5–6, 28; 704/9
  See application file for complete search history.

(56) References Cited

U.S. PATENT DOCUMENTS

| | | | |
|---|---|---|---|
| 5,832,452 | A | 11/1998 | Schneider et al. |
| 5,948,040 | A | 9/1999 | DeLorme et al. |
| 6,275,808 | B1 | 8/2001 | DeMarcken |
| 6,477,520 | B1 | 11/2002 | Malaviya et al. |
| 6,553,310 | B1 | 4/2003 | Lopke |
| 6,795,710 | B1 | 9/2004 | Creemer |
| 7,092,892 | B1 | 8/2006 | Sobalvarro et al. |
| 7,219,073 | B1* | 5/2007 | Taylor et al. ............... 705/26.62 |
| 7,286,998 | B2 | 10/2007 | Sauser et al. |
| 7,860,808 | B2 | 12/2010 | Peters |
| 7,983,956 | B1 | 7/2011 | Goel |
| 8,005,685 | B1 | 8/2011 | Bird |
| 8,035,511 | B2 | 10/2011 | Weaver et al. |
| 8,165,920 | B2 | 4/2012 | Goel |
| 8,332,247 | B1 | 12/2012 | Bailey et al. |
| 8,631,007 | B1* | 1/2014 | Blandford .......... G06Q 30/0241 707/736 |
| 8,762,160 | B2 | 6/2014 | Lulla |
| 9,043,151 | B2 | 5/2015 | Cai et al. |
| 9,286,629 | B2 | 3/2016 | Miller et al. |
| 9,659,099 | B2 | 5/2017 | Miller et al. |
| 2001/0044788 | A1 | 11/2001 | Demir et al. |
| 2002/0069133 | A1 | 6/2002 | Currie et al. |
| 2002/0082877 | A1 | 6/2002 | Schiff et al. |
| 2002/0178034 | A1 | 11/2002 | Gardner et al. |
| 2003/0018499 | A1* | 1/2003 | Miller .................... G06Q 10/02 705/5 |
| 2003/0050846 | A1 | 3/2003 | Rodon |
| 2003/0055690 | A1 | 3/2003 | Garback |
| 2003/0055772 | A1 | 3/2003 | Goldstein |
| 2003/0135458 | A1 | 7/2003 | Tadano et al. |
| 2003/0217052 | A1* | 11/2003 | Rubenczyk et al. ............... 707/3 |
| 2004/0111255 | A1 | 6/2004 | Huerta et al. |
| 2004/0220854 | A1 | 11/2004 | Postrel |
| 2004/0249680 | A1 | 12/2004 | Liew et al. |
| 2005/0038644 | A1 | 2/2005 | Napper et al. |
| 2005/0043940 | A1 | 2/2005 | Elder |
| 2005/0108068 | A1 | 5/2005 | Marcken et al. |
| 2005/0220278 | A1 | 10/2005 | Zirngibl et al. |
| 2005/0267651 | A1 | 12/2005 | Arango et al. |
| 2005/0288973 | A1 | 12/2005 | Taylor et al. |
| 2006/0106655 | A1 | 5/2006 | Lettovsky et al. |
| 2006/0178931 | A1 | 8/2006 | Horn |
| 2006/0241983 | A1 | 10/2006 | Viale et al. |
| 2006/0247954 | A1 | 11/2006 | Hunt |
| 2006/0265508 | A1 | 11/2006 | Angel et al. |
| 2006/0293930 | A1 | 12/2006 | Rodgers et al. |
| 2007/0073563 | A1 | 3/2007 | Dourthe et al. |
| 2007/0100962 | A1 | 5/2007 | Barth et al. |
| 2007/0106497 | A1 | 5/2007 | Ramsey et al. |
| 2007/0143154 | A1 | 6/2007 | Ashby et al. |
| 2007/0156469 | A1 | 7/2007 | Bird et al. |
| 2007/0174350 | A1 | 7/2007 | Pell et al. |
| 2007/0192186 | A1 | 8/2007 | Greene et al. |
| 2007/0198442 | A1 | 8/2007 | Horn |
| 2007/0203735 | A1 | 8/2007 | Ashton |
| 2007/0208503 | A1 | 9/2007 | Harnsberger |
| 2007/0276595 | A1 | 11/2007 | Lewinson et al. |
| 2007/0294149 | A1* | 12/2007 | Lu et al. ............ 705/28 |
| 2008/0021748 | A1 | 1/2008 | Bay et al. |
| 2008/0046274 | A1 | 2/2008 | Geelen et al. |
| 2008/0052217 | A1 | 2/2008 | Etkin |
| 2008/0059454 | A1 | 3/2008 | Andrieu |
| 2008/0091525 | A1 | 4/2008 | Kretz |
| 2008/0103949 | A1 | 5/2008 | Lobana et al. |
| 2008/0109232 | A1* | 5/2008 | Musgrove et al. ............... 705/1 |
| 2008/0114623 | A1 | 5/2008 | Berthaud et al. |
| 2008/0120306 | A1 | 5/2008 | Panabaker et al. |
| 2008/0201178 | A1 | 8/2008 | Vizitei |
| 2008/0319803 | A1 | 12/2008 | Heyraud et al. |
| 2009/0006143 | A1 | 1/2009 | Orttung et al. |
| 2009/0048876 | A1 | 2/2009 | Bonissone et al. |
| 2009/0063359 | A1 | 3/2009 | Connors |
| 2009/0070322 | A1 | 3/2009 | Salvetti et al. |
| 2009/0112639 | A1 | 4/2009 | Robinson Beaver |
| 2009/0157312 | A1 | 6/2009 | Black et al. |
| 2009/0157664 | A1 | 6/2009 | Wen |
| 2009/0210262 | A1 | 8/2009 | Rines et al. |
| 2009/0216633 | A1 | 8/2009 | Whitsett et al. |
| 2009/0234681 | A1 | 9/2009 | Champernowne |
| 2009/0319305 | A1 | 12/2009 | Weissert et al. |
| 2009/0327148 | A1 | 12/2009 | Kamar et al. |
| 2010/0010841 | A1 | 1/2010 | Cooper et al. |
| 2010/0030594 | A1 | 2/2010 | Swart |
| 2010/0082241 | A1 | 4/2010 | Trivedi |
| 2010/0153292 | A1 | 6/2010 | Zheng et al. |
| 2010/0217680 | A1 | 8/2010 | Fusz et al. |
| 2010/0217723 | A1 | 8/2010 | Sauerwein, Jr. et al. |
| 2010/0318386 | A1 | 12/2010 | Vaughan et al. |
| 2011/0046989 | A1 | 2/2011 | Crean et al. |
| 2011/0093361 | A1* | 4/2011 | Morales ..................... 705/26.62 |
| 2011/0125578 | A1 | 5/2011 | Alspector et al. |
| 2011/0137766 | A1 | 6/2011 | Rasmussen et al. |
| 2011/0153373 | A1* | 6/2011 | Dantzig ............ G06F 17/30286 705/5 |
| 2011/0167003 | A1 | 7/2011 | Nice et al. |
| 2011/0231182 | A1* | 9/2011 | Weider et al. .................... 704/9 |
| 2011/0246246 | A1 | 10/2011 | Johnson |
| 2011/0295692 | A1 | 12/2011 | Zivkovic et al. |
| 2012/0054001 | A1 | 3/2012 | Zivkovic et al. |
| 2012/0059679 | A1 | 3/2012 | de Marcken et al. |
| 2012/0209517 | A1 | 8/2012 | Li et al. |
| 2012/0233207 | A1 | 9/2012 | Mohajer |
| 2012/0239443 | A1 | 9/2012 | Miller et al. |
| 2012/0239455 | A1 | 9/2012 | Crean et al. |
| 2012/0239584 | A1 | 9/2012 | Yariv et al. |
| 2012/0239669 | A1 | 9/2012 | Miller et al. |
| 2012/0259667 | A1 | 10/2012 | Pelissier et al. |
| 2012/0265598 | A1 | 10/2012 | Krone |
| 2013/0041696 | A1 | 2/2013 | Richard |
| 2013/0054375 | A1 | 2/2013 | Sy et al. |
| 2013/0073325 | A1 | 3/2013 | Ross |
| 2013/0096965 | A1 | 4/2013 | Pappas et al. |
| 2013/0132129 | A1 | 5/2013 | Fox et al. |
| 2013/0151291 | A1 | 6/2013 | Salway |
| 2013/0158821 | A1 | 6/2013 | Ricci |
| 2013/0159023 | A1 | 6/2013 | Srinivas et al. |
| 2013/0166329 | A1 | 6/2013 | Amoux-Prost et al. |
| 2013/0339105 | A1 | 12/2013 | Russell et al. |
| 2014/0019176 | A1 | 1/2014 | Mandelbaum |
| 2014/0025540 | A1 | 1/2014 | Hendrickson |
| 2014/0074746 | A1 | 3/2014 | Wang |
| 2014/0089020 | A1 | 3/2014 | Murphy |
| 2014/0089036 | A1 | 3/2014 | Chidlovskii |
| 2014/0089101 | A1 | 3/2014 | Meller |
| 2014/0114705 | A1 | 4/2014 | Bashvitz et al. |
| 2014/0156411 | A1 | 6/2014 | Murgai |
| 2014/0229102 | A1 | 8/2014 | Bapna et al. |
| 2014/0257949 | A1 | 9/2014 | Gishen |
| 2014/0279196 | A1 | 9/2014 | Wilson et al. |
| 2014/0330605 | A1 | 11/2014 | Connolly et al. |
| 2014/0330606 | A1 | 11/2014 | Paget et al. |
| 2014/0330621 | A1 | 11/2014 | Nichols et al. |
| 2014/0337063 | A1 | 11/2014 | Nelson et al. |
| 2015/0012309 | A1 | 1/2015 | Buchheim et al. |
| 2015/0046201 | A1 | 2/2015 | Miller et al. |
| 2015/0066594 | A1 | 3/2015 | Li et al. |
| 2015/0066830 | A1 | 3/2015 | Wilson et al. |
| 2015/0235478 | A1 | 8/2015 | Blandin et al. |
| 2015/0242927 | A1 | 8/2015 | Will et al. |
| 2015/0278970 | A1 | 10/2015 | Valverde, Jr. et al. |
| 2016/0125559 | A1 | 5/2016 | Shekou |
| 2016/0162871 | A1 | 6/2016 | Lee |

(56) References Cited

U.S. PATENT DOCUMENTS

| | | | |
|---|---|---|---|
| 2016/0196271 | A1 | 7/2016 | Miller et al. |
| 2016/0202073 | A1 | 7/2016 | Claycomb et al. |
| 2016/0203422 | A1 | 7/2016 | Demarchi et al. |
| 2016/0232626 | A1 | 8/2016 | Geraci et al. |
| 2016/0258767 | A1 | 9/2016 | Nevrekar et al. |
| 2016/0364815 | A1 | 12/2016 | Miller et al. |
| 2016/0370197 | A1 | 12/2016 | Miller et al. |
| 2016/0371799 | A1 | 12/2016 | Miller et al. |
| 2016/0379142 | A1 | 12/2016 | Valverde, Jr. |
| 2017/0293722 | A1 | 10/2017 | Valverde, Jr. et al. |
| 2017/0316103 | A1 | 11/2017 | Miller et al. |

FOREIGN PATENT DOCUMENTS

| | | |
|---|---|---|
| WO | WO2012125753 | 9/2012 |
| WO | WO2012125761 | 9/2012 |
| WO | WO2015021180 | 2/2015 |
| WO | WO2015153776 A1 | 10/2015 |
| WO | WO2016201134 A1 | 12/2016 |
| WO | WO2016205076 A1 | 12/2016 |
| WO | WO2016205280 A1 | 12/2016 |
| WO | WO2016209679 A1 | 12/2016 |
| WO | WO2017180483 A1 | 10/2017 |

OTHER PUBLICATIONS

International Search Report and Written Opinion dated Nov. 24, 2014 in application No. PCT/US2014/049979.
United Hub. "FareLock: An Opportunity to Lock in Your Ticket Price for up to Seven Days." United Hub. Aug. 17, 2012. Retrieved on Oct. 17, 2014 from Internet URL <https://hub.united.com/en-us/news/products-services/pages/farelock-lets-you-lock-in-your-ticket-price.aspx>.
Mackenzie, Scott. "Two Services Help You Lock in a Good Deal on Airfare." Hack My Trip. Apr. 2014. Retrieved on Oct. 17, 2014 from Internet URL <http://hackmytrip.com/2014/04/two-services-help-lock-good-deal-airfare/>.
Boardman, Al. "Options Away." Vimeo. May 24, 2013. Retrieved on Oct. 17, 2014 from Internetnet URL <http://vimeo.com/66936261>.
International Search Report and Written Opinion dated Jun. 15, 2012 in application No. PCT/US2012/029121.
International Search Report and Written Opinion dated Jun. 7, 2012 in application No. PCT/US2012/029098.
International Search Report and Written Opinion dated Mar. 14, 2013 in application No. PCT/US2012/029112.
International Search Report and Written Opinion dated Jul. 2, 2015 in Patent Cooperation Treaty application No. PCT/US2015/023901, filed Apr. 1, 2015.
Office Action dated Feb. 26, 2016 in Canadian Patent Application No. 2830228 filed Sep. 13, 2013.
Office Action dated May 18, 2016 in Canadian Patent Application No. 2830224 filed Mar. 14, 2012.
Office Action dated May 19, 2016 in Canadian Patent Application No. 2830229 filed Mar. 14, 2012.
International Search Report and Written Opinion dated Jul. 11, 2016 in Patent Cooperation Treaty application No. PCT/US2016/037555, filed Jun. 15, 2016, 13 pages.
International Search Report and Written Opinion dated Sep. 1, 2016 in Patent Cooperation Treaty application No. PCT/US2016/036760, filed Jun. 9, 2016, 12 pages.
International Search Report and Written Opinion dated Sep. 9, 2016 in Patent Cooperation Treaty application No. PCT/US2016/037503, filed Jun. 15, 2016, 10 pages.
International Search Report and Written Opinion dated Sep. 27, 2016 in Patent Cooperation Treaty application No. PCT/US2016/036749, filed Jun. 9, 2016, 13 pages.
"Notice of Allowance," Canadian Patent Application No. 2830228, dated Jan. 12, 2017, 1 page.
"Notice of Allowance," Canadian Patent Application No. 2830224, dated May 4, 2017, 1 page.
"Office Action," Canadian Patent Application No. 2830229, dated Apr. 28, 2017, 4 pages.
"International Search Report" and "Written Opinion," Patent Cooperation Treaty Application No. PCT/US2017/026708, dated Jul. 7, 2017, 13 pages.
"Office Action," Canadian Patent Application No. 2830229, dated Mar. 16, 2018, 5 pages.
Mayerowitz "Latest Airline Fee: $9 to Lock in Airfare," ABC News [online], Dec. 13, 2010 (retrieved on Dec. 21, 2018], Retrieved from the Internet: <URL:http://web.archive.org/web/20110122133909/http://abcnews.go.com/Travel/airline-fees-forgot-checked-bags-pay-lock-airfare/story?id=12385126> 8 pages.

* cited by examiner

US 10,078,855 B2

MANAGING AN EXCHANGE THAT FULFILLS NATURAL LANGUAGE TRAVEL REQUESTS

CROSS REFERENCE TO RELATED APPLICATIONS

This application claims the priority benefit of U.S. provisional patent application Ser. No. 61/452,633, filed on Mar. 14, 2011. This application relates to the Applicants' co-pending U.S. non-provisional patent application Ser. No. 13/419,989, filed on Mar. 14, 2012, now U.S. Pat. No. 9,286,629 issued on Mar. 15, 2016, and to the Applicants' co-pending U.S. non-provisional patent application Ser. No. 13/420,179, filed on Mar. 14, 2012. All of the above referenced applications are hereby incorporated by reference herein in their entirety.

FIELD OF THE PRESENT TECHNOLOGY

The present technology relates generally to an exchange for fulfilling natural language travel requests, and more specifically, but not by way of limitation to an exchange that allows suppliers to provide inventory records and customers to input travel itinerary requests in a natural language format, and fulfills the travel itinerary requests by applying pattern recognition artificial intelligence and/or semantic parsing to inventory records and travel itinerary requests to obtain matches therebetween.

BACKGROUND

The ability to sell more inventory and to sell current inventory more efficiently and to differentiate product is extremely important and urgent to suppliers, especially in the travel and hospitality industries. Additionally, consumers want and need more choice and inventory. The current legacy supply chain for fulfilling travel related needs of consumers is complicated and remains under the control of various companies, most of which directly or indirectly compete with one another. Even if those within the supply chain are not hindered from cooperating by competition, balkanization of services/responsibilities within a single supplier may further hinder these legacy supply chains. For example, with respect to an airline, current inventory may be maintained by one entity or department while flights are managed by another department and/or business. Moreover, airline rules and pricing may be managed by yet another department and/or business. Business processes that interact with these legacy systems must be structured to correspond to these entities and their rules. For each entity, a completely different set of requirements may be imposed upon business processes that depend upon these entities. In sum, the structures of these legacy supply chain systems make it extremely difficult, if not impractical, to properly aggregate offerings and/or add new inventory that would be recognized and accepted by the legacy systems. Additionally, legacy supply chain systems only support small portions of the overall travel and hospitality industry.

SUMMARY OF THE PRESENT TECHNOLOGY

According to some embodiments, the present technology may be directed to methods for managing an exchange that fulfills natural language travel requests. The methods may comprise: (a) receiving a plurality of inventory records from a plurality of suppliers, each of the plurality of inventory records pertaining to an available offering, the offering being defined by a set of metadata attributes; and (b) generating equivalent phrases for the set of metadata attributes from each inventory record by applying pattern recognition artificial intelligence to the set of metadata attributes, the equivalent phrases representing possible natural language queries to which an inventory record may correspond.

According to other embodiments, the present technology may be directed to systems for managing an exchange that fulfills natural language itinerary requests. The systems may comprise: (a) a memory for storing executable instructions; (b) a processor for executing the instructions; (c) a publishing module stored in memory and executable by the processor to receive a plurality of inventory records from a plurality of suppliers, each of the plurality of inventory records pertaining to an available offering, the offering being defined by a set of metadata attributes; and (d) a pattern recognition artificial intelligence engine stored in memory and executable by the processor to generate equivalent phrases for the set of metadata attributes from each inventory record by applying pattern recognition artificial intelligence to the set of metadata attributes, the equivalent phrases representing possible natural language queries to which an inventory record may correspond.

According to additional embodiments, the present technology may be directed methods for managing an exchange that fulfills natural language travel requests. The methods may comprise: (a) receiving a bid from a first party, the bid comprising a set of metadata attributes; (b) parsing the bid to: (i) evaluate the set of metadata attributes for the bid; and (ii) determine at least one category to associate with the bid based upon the set of metadata attributes of the bid; (c) generating equivalent phrases for the set of metadata attributes of the bid by applying pattern recognition artificial intelligence to the set of metadata attributes, the equivalent phrases representing available bid queries; and (d) placing the bid request in an exchange system for fulfillment, the bid request comprising at least one of the available bid queries.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be understood that the technology is not necessarily limited to the particular embodiments illustrated herein.

DETAILED DESCRIPTION

Figure 1:
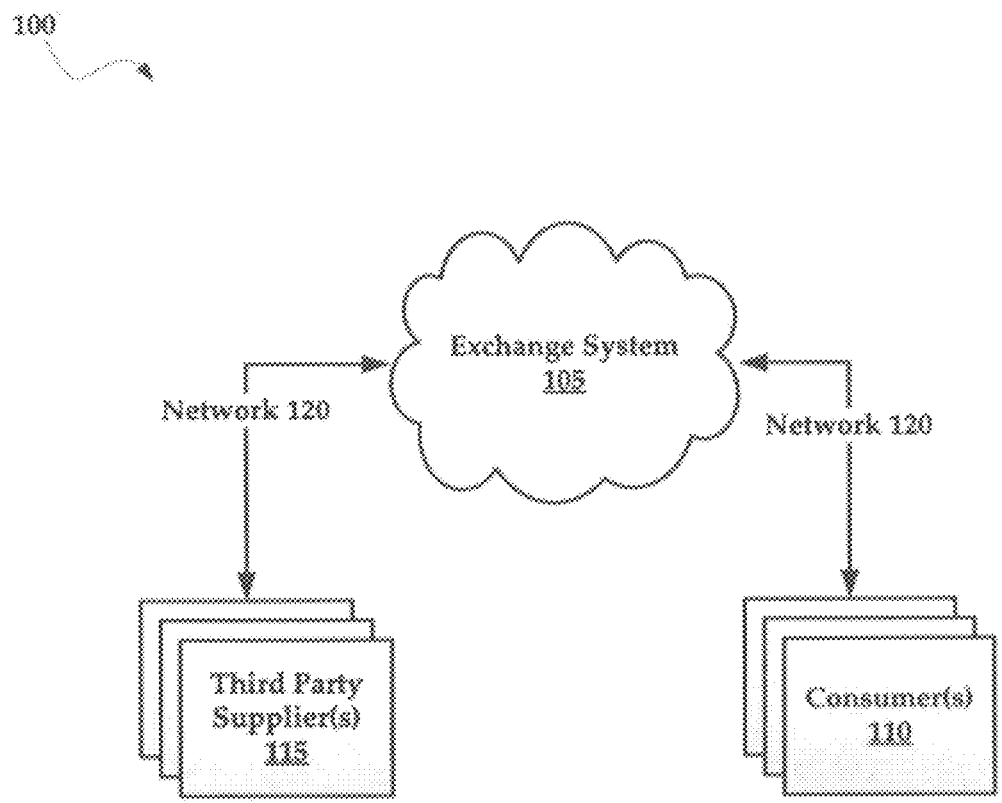
FIG. 1 illustrates an exemplary architecture for practicing aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Generally speaking, the present technology comprises systems, methods, and media for managing an exchange that fulfills travel requests. More specifically, but not by limitation, the present technology may fulfill travel requests in the form of natural language expressions of a travel itinerary. In other embodiments, the request may comprise a non-natural language request, such as a keyword request, a Boolean phrase, and so forth. The present technology provides a simplified supply chain for the addition, organization, and consumption of inventory, together with a simplified distribution model. Additionally, the systems provided herein may also interact seamlessly with the legacy systems.

Broadly described, the present technology may include one or more of the following components, such as an exchange that functions as an inventory aggregator that holds actual and virtual inventory (e.g., inventory or data that represents inventory), together with methods for handling such data. The present technology may also employ a publishing module that allows suppliers to publish any type of inventory onto the exchange. Also, the present technology may provide consumers (e.g., travelers) with various ways to identify, request, receive, and/or consume inventory provided by suppliers.

Although the exchange can be employed for general commerce, for the purposes of brevity and clarity, descriptions of the exchange may be limited to use within the travel and hospitality industries.

When working in combination, these components provide a unique end-to-end combined experience for the supplier and consumer in their respective abilities to define and consume inventory. Within this architecture, suppliers can offer any type of inventory, and consumers may request and consume such inventory within the context of the exchange.

The present technology may utilize various types of pattern recognizing artificial intelligence and/or logic to process inventory requests/bids, generate inferences models from inventory requests, along with semantic natural language parsing to process natural language queries, such as travel itinerary requests.

For each request and or itinerary, the exchange determines the consumer profile and the request inventory using pattern recognition, inference modeling and so forth. It notifies suppliers who have registered to be notified and supplies them with the requests, itinerary and consumer profile.

Notifications allow the exchange to act as a virtual inventory, together with a physical inventory, further aggregating inventory without adding undue complexity to the supply chain. The notification modality allows the supplier to dynamically allocate inventory and dynamically price inventory based on a complex set of consumer data and draw important inferences about the consumer. Suppliers may utilize this data to determine how to structure their inventory and offers. Suppliers may also search their published inventory on the exchange, and/or taking inventory from an external source. A further capability of the open nature of the exchange is that a supplier may combine another supplier's inventory together with their inventory and offer the combined inventory in an offer.

The present technology may also employ additional voucher features that allow suppliers to motivate consumers to consume the supplier's inventory. For example, the supplier may offer a free golf bag to all business class travelers.

The present technology may also facilitate marketing processes. For example, advertisers may also register for inventory and buyer profiles, which may be utilized to generate highly accurate direct advertising that can be provided to actual consumers, targeted to their very specific profiles and content requirements.

The exchange provides the ability for the consumers to place requests on the exchange, for suppliers to be notified and to make offers to requests, for customers to accept offers, for facilitating payments on accepted contracts, and for the supply of information provided by the suppliers to the clients regarding their contracts.

In one sense, the exchange holds no inventory, in another, every offer may correspond to an actual type of inventory (e.g., an offer from a supplier) and suppliers can place as many on the platform as they choose. Requests and offers may have attributes such as time expiry or other conditions, provided they conform to the exchange rules, if any.

Referring to the collective drawings (e.g., FIGS. 1-7), the present technology may facilitate an exchange that fulfills natural language travel requests. The present technology may be implemented within the context of an exemplary architecture 100, hereinafter "architecture 100" as shown in FIG. 1. The architecture 100 may be described as generally including an exchange 105 may communicatively couple with consumers 110 and third party suppliers 115, via a network 120. It is noteworthy to mention that the network 120 may include any one (or combination) of private or public communications networks such as the Internet. The consumers 110 may interact with the exchange 105 via end user client devices that access a web based interface, or an application resident on the end user client device.

In some embodiments, the third party suppliers 115 may communicatively couple with the exchange 105 (also sometimes referred to herein as exchange system 105) over the network 120 via an application programming interface ("API"). It is noteworthy that other methods/systems that allow the third party suppliers 115 and the exchange 105 to communicatively couple with one another, that would be known to one or ordinary skill in the art are likewise contemplated for use in accordance with the present disclosure.

According to some embodiments, the architecture 100 may include a cloud based computing environment. In general, a cloud-based computing environment is a resource that typically combines the computational power of a large grouping of processors and/or that combines the storage capacity of a large grouping of computer memories or storage devices. For example, systems that provide a cloud resource may be utilized exclusively by their owners, such as Google™ or Yahoo!™; or such systems may be accessible to outside users who deploy applications within the computing infrastructure to obtain the benefit of large computational or storage resources.

The cloud may be formed, for example, by a network of web servers, with each web server (or at least a plurality thereof) providing processor and/or storage resources. These servers may manage workloads provided by multiple users (e.g., cloud resource consumers or other users), in conjunction with other cloud computing benefits such as hosting, processing, bandwidth, and so forth. Typically, each user places workload demands upon the cloud that vary in real-time, sometimes dramatically. The nature and extent of these variations typically depend on the type of business associated with the user.

The exchange 105 may be generally described as a particular purpose computing environment that includes executable instructions that are configured to receive and fulfill natural language requests, such as travel itinerary requests.

Figure 2:
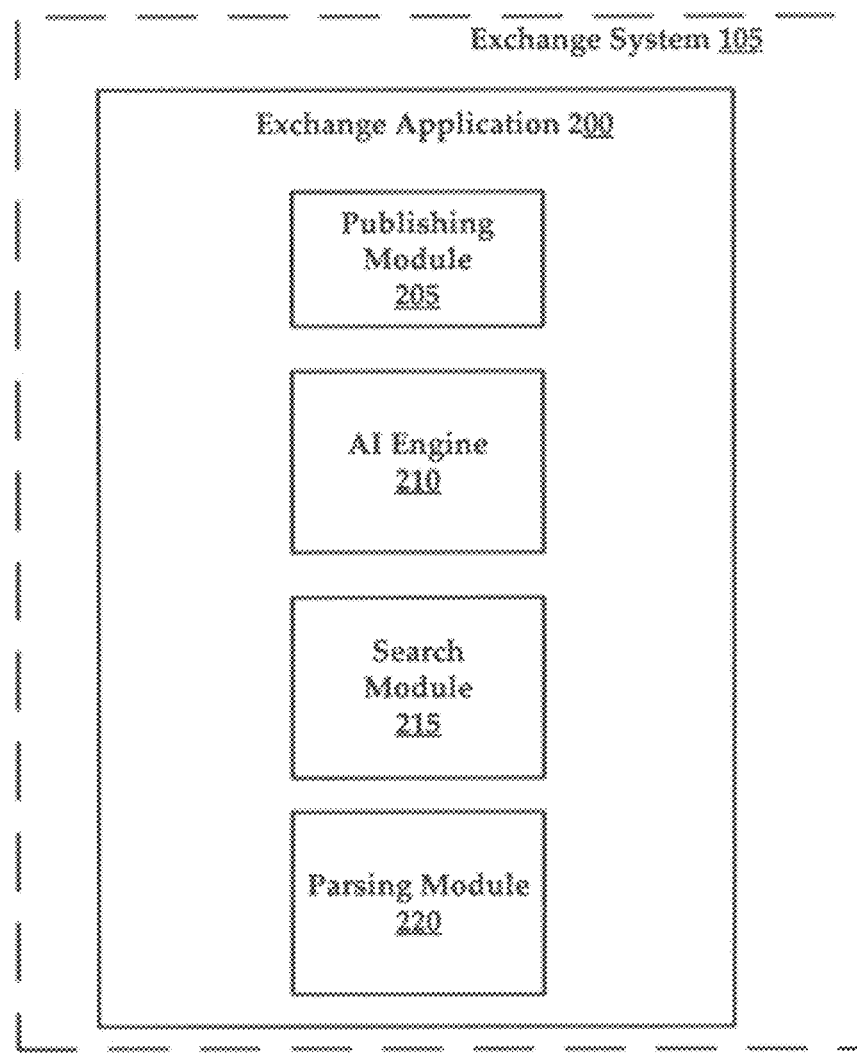
FIG. 2 illustrates an exemplary exchange system, constructed in accordance with the present technology.

In some embodiments, the exchange 105 may include executable instructions in the form of an exchange application, hereinafter referred to as "application 200" that provides various functionalities that will be described in greater detail herein. FIG. 2 illustrates and exemplary schematic diagram of the application 200.

The application 200 is shown as generally comprising components such as a publishing module 205, a pattern recognition artificial intelligence engine, hereinafter "AI engine 210," a search module 215, and a semantic parsing module, hereinafter "parsing module 220." It is noteworthy that the application 200 may include additional modules, engines, or components, and still fall within the scope of the present technology. As used herein, the terms "module" and "engine" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality. In other embodiments, individual components of the application 200 may include separately configured web servers.

Figure 3:
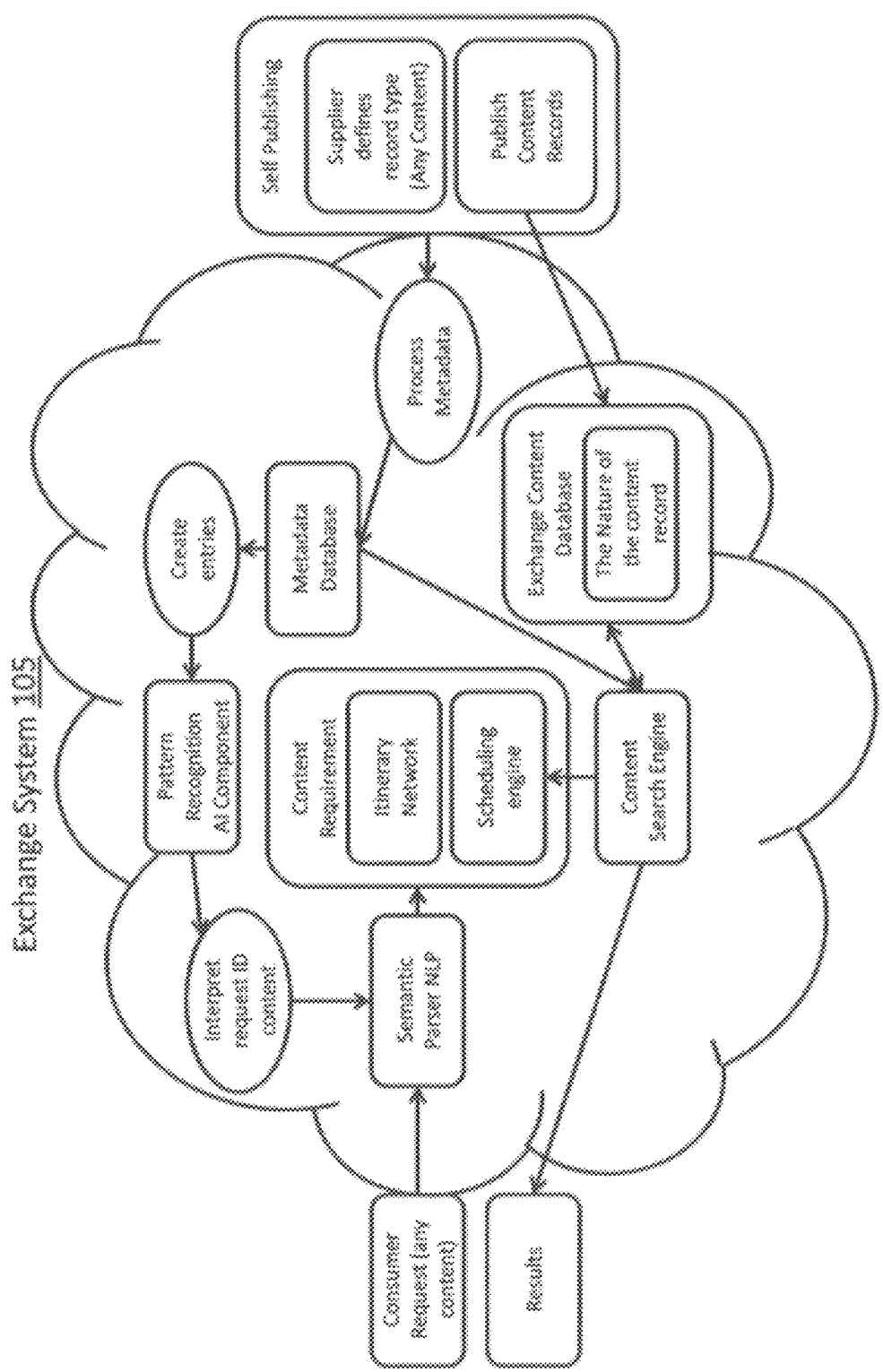
FIG. 3 illustrates flow diagram of events through an exchange system.

FIG. 3 includes an exemplary flow diagram that illustrates the flow of data from a publishing environment. While functional details regarding the exchange system 105 will be described with reference to additional figures described below (e.g., FIGS. 4-6), the overall operational flow of the exchange system 105 is shown in FIG. 3.

The present technology provides an open exchange where suppliers can self-publish their inventory, as well as maintain control over and manage their inventory using the publishing module 205. According to some embodiments, inventory may be described and/or defined on the exchange 105 as inventory records, where each record corresponds to an offering provided by a supplier. Metadata tags may be associated with each inventory record. These metadata tags include metadata attributes that qualify, quantify, describe, and/or govern the inventory (an offering from a supplier).

It will be understood that the supplier may define any inventory desired and any number of associated metadata tags for that their inventory. It is also noteworthy to mention that the term "inventory" as used herein may include both physical and virtual quantities of goods and/or services provided by any type of supplier.

According to some embodiments, the exchange 105 may comprise many standard inventory record definitions for common travel content such as airline tickets, hotels, cars, tours, and so forth. In these cases, default inventory record types (e.g., inventory record template) may be provided to the supplier together with a list of common metadata tags. The supplier can add their own metadata which can be made exclusive to the supplier.

It will be understood that in some instances, the supplier provides inventory records in a free form format. The present technology may employ semantic parsing and/or pattern recognition AI to evaluate these free form inventory records, similarly to the manner in which the present technology parses and interprets consumer requests.

Record type declarations may associate inventory with its corresponding inventory record. Additionally, the inventory record may comprise contextual references that allow the exchange to differentiate (or group together) the records from one another. For example, an inventory instance may apply to air travel. In other instances, the context of an inventory type may be inferred from the data and referenced by the exchange 105.

Once published, inventory records may be placed on the exchange 105 in an inventory database, along with an identifier that references the supplier. A supplier can add new content or extend current content dynamically. A supplier can also interrogate inventory metadata on the exchange, modify it, and/or add new metadata. A supplier may also directly control inventory records placed on the exchange and obtain information about their current inventory records.

Inventory records and corresponding metadata may be communicated to the exchange 105 via the publishing module 205, either using APIs or as files containing inventory records. Because the exchange accepts many types of inventory definitions, the exchange may be configured to determine that the inventory is appropriate and legal.

Suppliers may also add an expiry date and time to an inventory record so that that the inventory record may automatically disappear upon the occurrence of the expiry date and time. For example, all inventory records for flights that have occurred may be deleted from the exchange. In another example, the supplier may also have established a rule that defines the time a consumer may hold a seat on a flight, after which it will become available to other consumers or be returned to the exchange.

It is noteworthy to mention that the inventory database may be partitioned into categories such as flight, hotel, cars, and so forth. Categories may provide context for organizing inventory records and fulfilling travel queries. For example, if a natural language travel query includes requests for overhead carryon space during your stay at a hotel in San Francisco, such a request would make no sense in the context of a hotel visit. Thus, when inventory is added to the inventory database and properly categorized, the parsing module 220 "knows" not only what is being requested, but also what portion of the itinerary to which the portion of the request belongs. The functionalities of the parsing module 220 will be described in greater detail herein.

Figure 4:
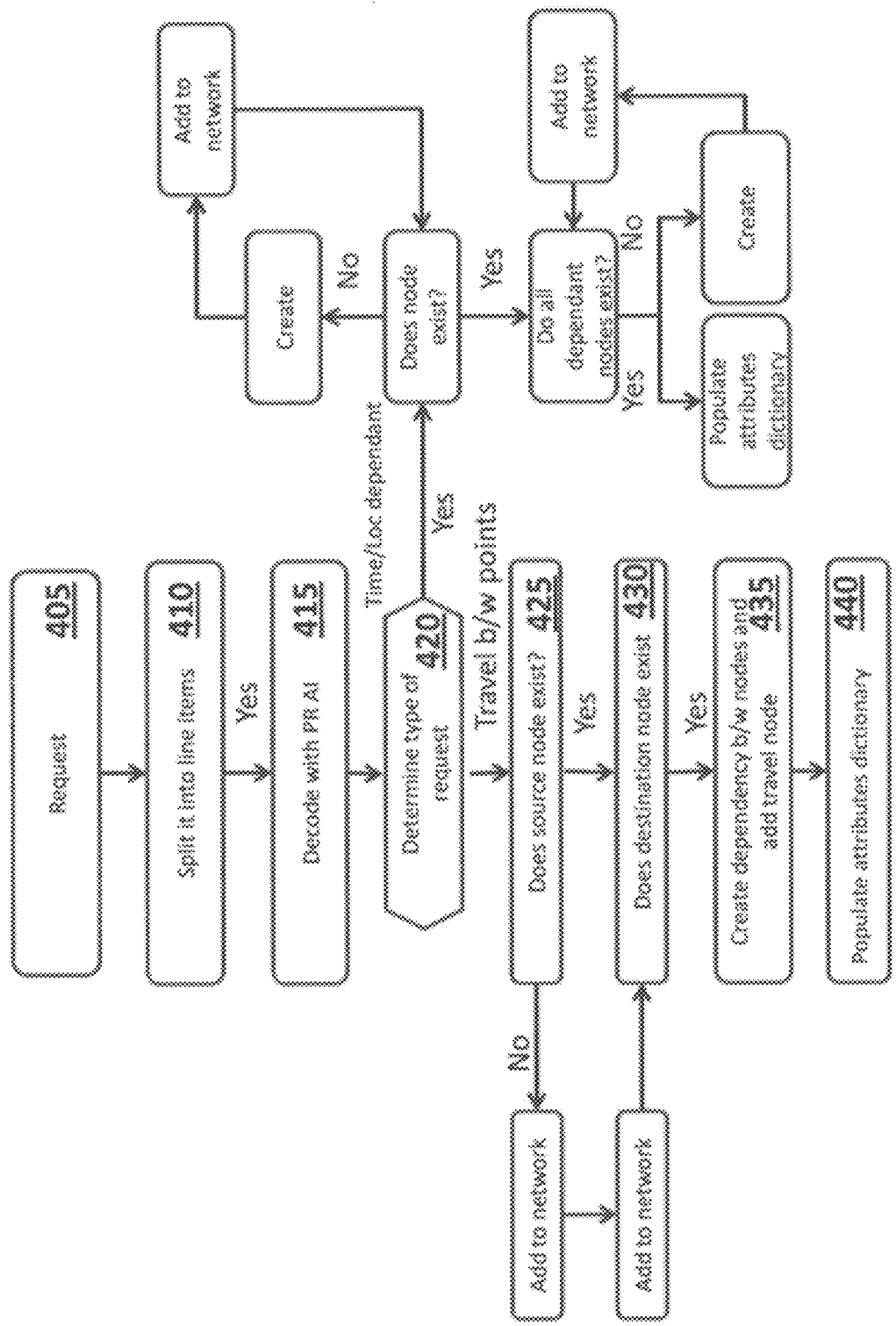
FIG. 4 illustrates a flow diagram of an exemplary method for publishing inventory records to an exchange system.

Referring now to FIGS. 2 and 4 collectively, the publishing module 205 may employ the AI engine 210 to infer a category for an inventory record (also referred to as a "Meta Data Record").

Supposing that a supplier passes an inventory record (Step 405) having the following metadata attributes: "Record Type, Meta Data name, a Value set, a Value Type, an Inference tag." For example an inventory record may comprise the following metadata attributes: "Carryon, Carryon, (0, 1, 2), Integer, Flight." The AI engine 210 may infer a category for an inventory record (Step 410). For example, the inference tag of "Flight" instructs AI engine 210 that the inventory record belongs to the flight category. Therefore, if a natural language query includes a carryon dependency, it can be inferred that a carryon dependency may probably be attached (or dependent) on the flight nodes of their itinerary.

In some instances, if the AI engine 210 cannot find a corresponding category for an inventory record, the AI engine 210 may create a new category for the inventory record (Step 415) and place the metadata attributes for the inventory record in the new category.

In some instances, each category may be further partitioned into inventory or recordtype tags (Step 420). Using flight as an example, an inventory record may define metadata attributes such as seats, carryons, priority check-in and boarding, food and beverage, among others. The inventory record may be partitioned based upon the metadata attributes included therein. It is noteworthy that a single inventory record may have multiple metadata attributes associated with it. If the inventory record defines a seat on a flight for instance, the inventory record may include metadata such as row, seat number, legroom, pricing, seat class, emergency exit, and kids section—just to name a few.

Returning to the previous carryon example, which may comprise a single entry "carryon." A supplier may define the data more specifically, such as "overhead carryon," or "under seat carryon." The words utilized to define the metadata attributes may be utilized to create phraseology, as will be described in greater detail below.

According to some embodiments, the AI engine 210 may extract information from the inventory record (Step 425), such as name, value type, and value set. The value type instructs the AI engine 210 as to what kind of pattern to look for. The AI engine 210 may employ different patterns relative to a single quantity of something against a range of options, for example. The AI engine 210 may then use the value set, which may comprise a list of admissible options for the content being requested. In some instances, the value set may be determined by what the supplier finds acceptable to offer. For example, one airline might allow only two carryons, whereas another airline may offer three.

The AI engine 210 may create an equivalence class of phrases (Step 430) from the metadata for an inventory record. The AI engine 210 may generate a list of patterns from the metadata attributes. The patterns may represent various permutations for which a consumer may ask for the value set with the metadata name (e.g., possible natural language queries). The phrases may be equivalent in the type of content to which they relate, and may therefore be addressed in a common manner. That is, each of the equivalent phrases may be expected to return the same response, although they include different words or arrangements of words relative to one another.

Utilizing equivalent phrases enables the present technology to function substantially agnostically to variations in natural language queries. Stated otherwise, it is of no importance that the consumer speaks in pigeon English, Latin, French, so long as the pattern of speech substantially corresponds to at least one of the equivalent phrases the equivalence class databases. The pattern recognition utilized by the AI engine 210 may cover the lexicon of each travel inventory and detect substantially all mannerisms in which the inventory can be phrased.

According to some embodiments, the search module 215 may be executed to receive a natural language travel query from a consumer. In some instances the natural language travel query may correspond to an itinerary. For example, a natural language query may include, "I want to buy a carry-on for a flight on Mar. 22, 2012 from Toronto to Seattle."

Figure 5:
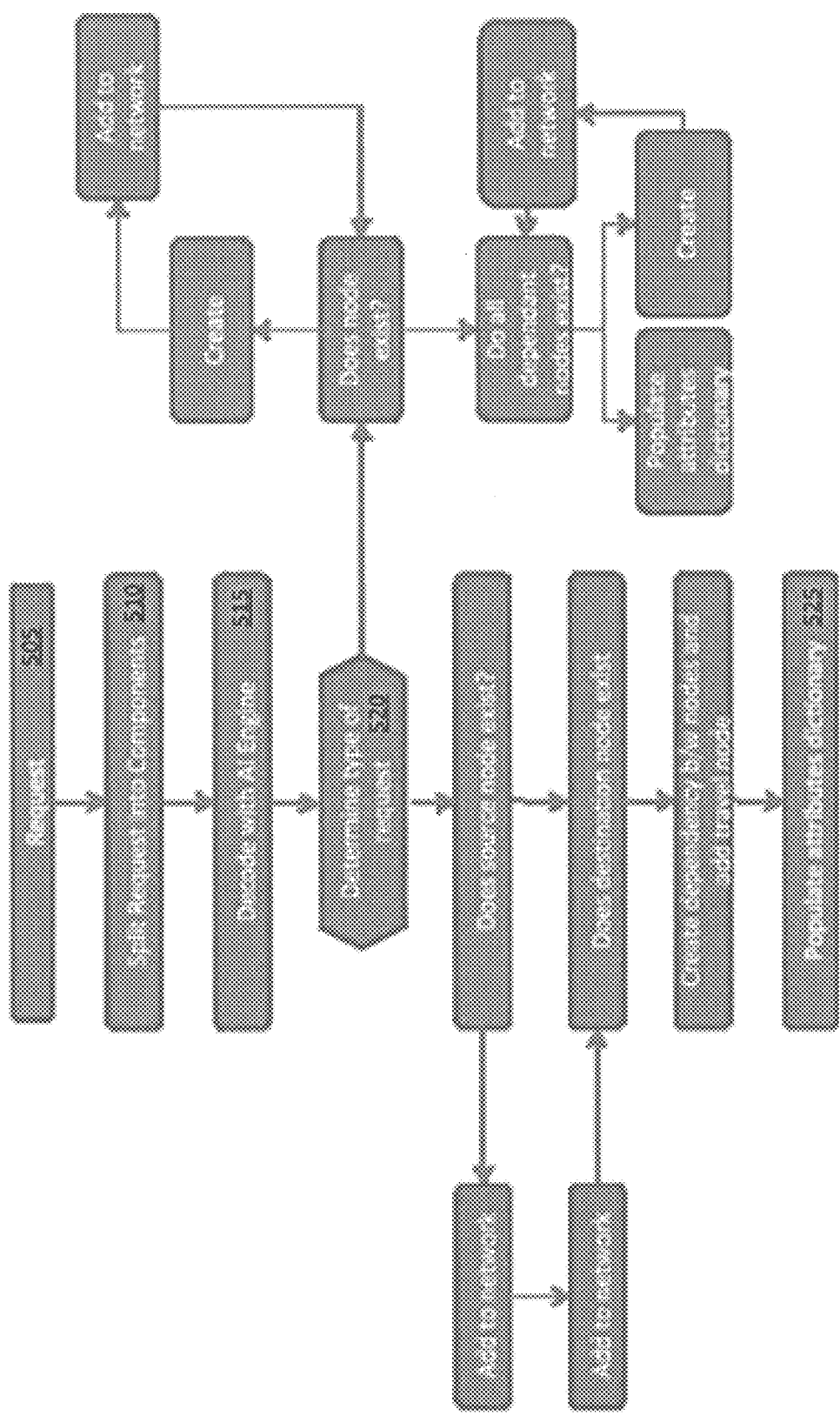
FIG. 5 illustrates a flow diagram of an exemplary method for processing natural language travel requests.

Referring now to FIGS. 2 and 5 collectively, the search module 215 may utilize the parsing module 220 to interpret the natural language queries. FIG. 5 illustrates a flowchart of an exemplary method for parsing natural language queries.

According to some embodiments, the semantic parsing module 220 may utilize a directed acyclic graph to interpret natural language queries. For the purpose of explaining how the parsing module 220 identifies requests for inventory, the following description may explain how a search query is built.

The parsing module 220 may first (Step 505) delimit the natural language query. For example, the parsing module 220 may determine inventory components in the query.

The parsing module 220 may parse through each delimited string (Step 510), and transmit the delimited strings to the AI engine 210. The AI engine 210 may employ a combination of phraseology and keyword inference (Step 515) to decode what type of request is being made. The AI engine 210 may reference the metadata database and the equivalence class database. Keywords included in an AI pattern recognition database may direct the AI engine 210 to appropriate content categories for the inventory components included in the request (Step 520). The AI engine 210 may employ additional inferential methods as well as statistical methods and frequency to determine where and how to match content to the request.

For instance, if the natural language query contains the word "stay," the AI engine 210 may infer that the customer is inquiring about a lodging somewhere and therefore the AI engine 210 may search through the equivalent phrases relevant to hotels. If the AI engine 210 finds a match, it will examine the hotel category of the inventory database and may repeat the process for relevant inventory. If the AI engine 210 does not find a match, the AI engine 210 may search through the remaining phrases of other categories. The AI engine 210 may prompt the consumer if the AI engine 210 is unable to find a match. For example, a prompt may include, "you want to stay somewhere?"

Given a natural language query with an itinerary component, say for example flight, the parsing module 220 may utilize the natural language free-form text and construct a library of attributes for the flight node.

The AI engine 210 may examine each word in the sentence, and locate keywords such as "From," "To," "Class," "dollars," and so forth. When the AI engine 210 finds a keyword, the AI engine 210 may evaluate the appropriate equivalence class of phrases that deal with that keyword. For example, in flight metadata "cost" has many keywords, such as "$" and "dollars." Therefore, the parsing module 220 may examine the equivalence class of phrases for cost, one of which might comprise "{integer value 0-9 repeated 600 times} dollars."

The AI engine 210 may evaluate admissible phrases until a match is determined. Subsequently, the AI engine 210 may decode the sentence using the mechanisms/methods previously described for metadata records.

The parsing module 220 may evaluate each word of the sentence. If no keywords are found, nothing is constructed. However the AI engine 210 may employ a "similar to" inference functionality which allows for variation among the phraseology to account for different ways that natural language queries may be structured such as incorrect spelling, grammar, and similar contingencies.

As the metadata tags for the record type are identified and evaluated they are added to the search query in the form of a suitable structure—in this case a dictionary (Step 525). The resulting dictionary may comprise: {"Record", "Carry-on"}, {"Date", "Mar. 22, 2012"}, {"Flight", "541"}.

It is noteworthy to mention that when the parsing module 220 encounters a metadata record but the AI engine 210 does not recognize the phraseology the AI engine 210 may employ a heuristic component to learn the new phrase and append the phrase to an appropriate equivalence class.

The search module 215 may utilize the attribute dictionary described above to create a search query. For example, the search module 215 may construct a SQL-like search expression that is supported by the exchange database. An exemplary search query generated from the attribute dictionary may comprise: "SqlQuery<SpaceDocument>query=new SqlQuery<SpaceDocument>("Carry-on", Date='Mar. 22, 2012' AND Flight="541")."

As mentioned previously, attributes or inventory components may often be interdependent with one another. For example, if a consumer is flying from Toronto to Seattle, purchasing a "carry-on" is dependent on the flight chosen. Likewise, a hotel may be dependent on the arrival date and time of the flight. The ability of the present technology to hold and aggregate content may affect how inventory is accessed and how dependencies may be established between inventory components.

The search module 215 provides for complex searches that allow consumers to explicitly define these dependencies. For example, "find 'carry-on' where date='flight.Arrival.'"

According to some embodiments, inventory records on the exchange can contain fields that are private to the exchange. Amongst these fields, the exchange can keep a log of the number of times a piece of content is selected, together with the anonymous context of that selection. In most legacy systems, an item in inventory is requested, but the context, consumer profile and the itinerary are absent. On the exchange these unrelated types of data may co-exist and be interrelated to one another.

Figure 6:
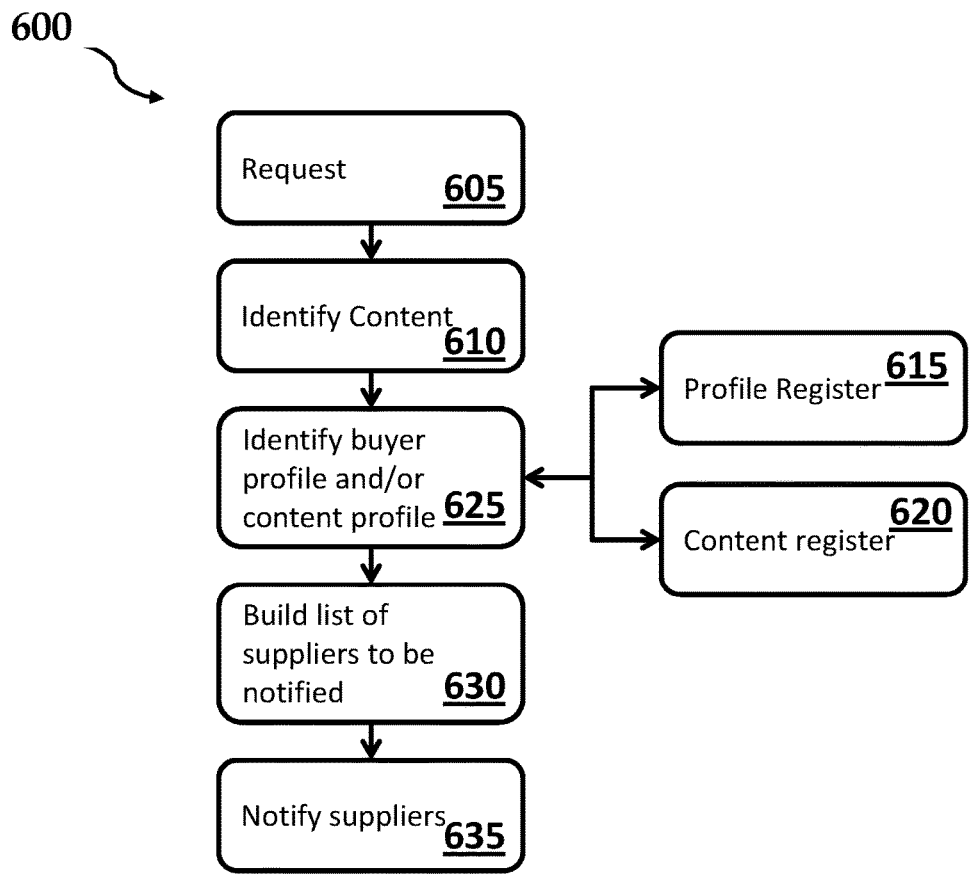
FIG. 6 illustrates a flow diagram of an exemplary method for managing an exchange that fulfills natural language travel requests.

FIG. 6 illustrates a flowchart 600 of an exemplary process for managing bid-ask requests within the exchange. Consumers may request (Step 605) inventory that is not currently on the exchange, by utilizing bid-ask functionalities provided by the exchange. In sum, the exchange may facilitate different modalities where consumers may search pre-defined inventory or request inventory not currently on the exchange in a bid-ask process.

Inventory can be considered a set of static offers for inventory on the exchange. The exchange may provide comprehensive rich search engines that can identify content (Step 610), such as current inventory, that have been published to the exchange. Searches may also identify combinations of inventory based upon dependencies between the inventory entries such as hotels that can be associated with the arrival dates of flights.

Suppliers may register exemplary consumer profiles (Step 615) and the content (Step 620) for which interactions are preferred. Suppliers register inventory by submitting valid inventory records that may comprise metadata attributes, conditions and/or constraints such as "Flights" with "Source"="YYZ" and "Destination"="SEA." In this case the supplier may only be notified of requests (e.g., natural language queries) that require these conditions.

Inventory registration may allow for rich inventory and may incorporate one or more aspects of consumer profiles. For example, a supplier may desire to receive requests for all business class flyers. Additionally, inferential profiles may be generated from various types of information determined from consumers, such as keywords and/or phraseology determined from requests of the consumer by the AI engine. Consumer profiles may be established by the exchange and may be anonymous in the sense that personally identifiable information associated with the consumer may be kept private. The exchange may employ inference techniques for classifying consumer profiles and provides these classifications to various suppliers.

Once potential consumer/buyer profiles have been identified (Step 625), the exchange system may build a list of suppliers that are to be notified, based upon information included in the request/bid (Step 630). Finally, the exchange may notify (Step 635) appropriate suppliers/sellers that requests that fit their preferences have been received.

Figure 7:
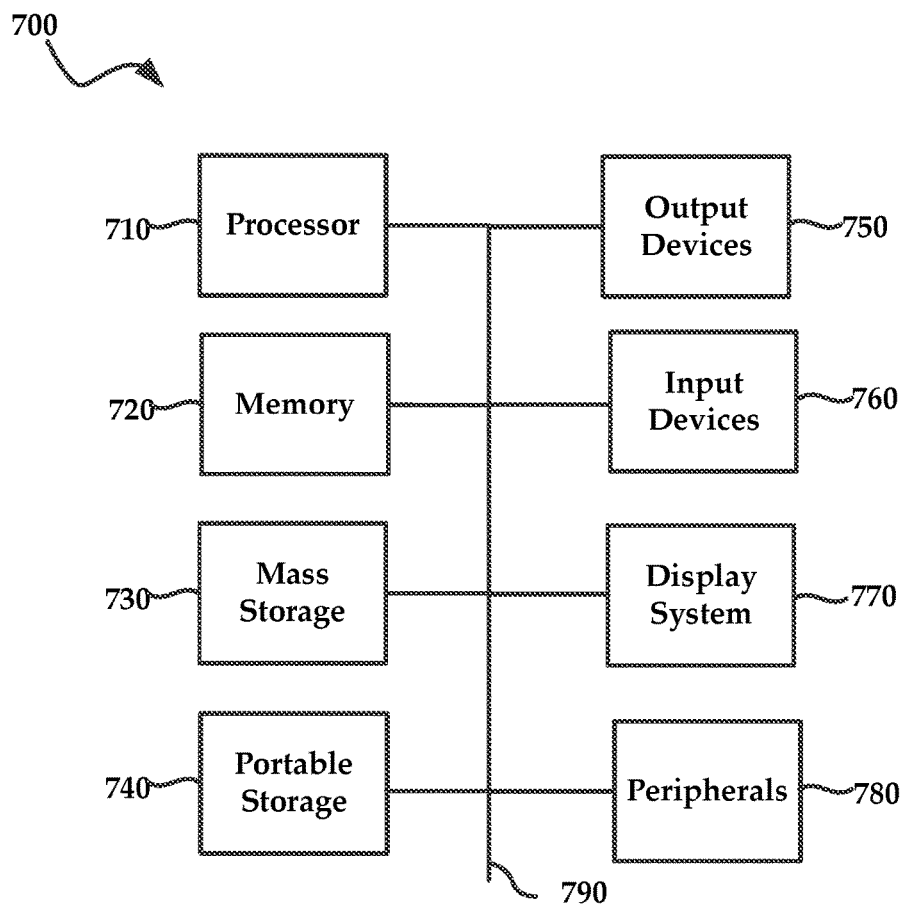
FIG. 7 is a block diagram of an exemplary computing system for implementing embodiments of the present technology.

FIG. 7 illustrates an exemplary computing system 700 that may be used to implement an embodiment of the present technology. The system 700 of FIG. 7 may be implemented in the contexts of the likes of computing systems, networks, exchanges, servers, or combinations thereof disclosed herein. The computing system 700 of FIG. 7 includes one or more processors 710 and main memory 720. Main memory 720 stores, in part, instructions and data for execution by processor 710. Main memory 720 may store the executable code when in operation. The system 700 of FIG. 7 further includes a mass storage device 730, portable storage medium drive(s) 740, output devices 750, user input devices 760, a graphics display 770, and peripheral devices 780.

The components shown in FIG. 7 are depicted as being connected via a single bus 790. The components may be connected through one or more data transport means. Processor unit 710 and main memory 720 may be connected via a local microprocessor bus, and the mass storage device 730, peripheral device(s) 780, portable storage device 740, and display system 770 may be connected via one or more input/output (I/O) buses.

Mass storage device 730, which may be implemented with a magnetic disk drive or an optical disk drive, is a non-volatile storage device for storing data and instructions for use by processor unit 710. Mass storage device 730 may store the system software for implementing embodiments of the present technology for purposes of loading that software into main memory 720.

Portable storage device 740 operates in conjunction with a portable non-volatile storage medium, such as a floppy disk, compact disk, digital video disc, or USB storage device, to input and output data and code to and from the computer system 700 of FIG. 7. The system software for implementing embodiments of the present technology may be stored on such a portable medium and input to the computer system 700 via the portable storage device 740.

Input devices 760 provide a portion of a user interface. Input devices 760 may include an alphanumeric keypad, such as a keyboard, for inputting alpha-numeric and other information, or a pointing device, such as a mouse, a trackball, stylus, or cursor direction keys. Additionally, the system 700 as shown in FIG. 7 includes output devices 750. Suitable output devices include speakers, printers, network interfaces, and monitors.

Display system 770 may include a liquid crystal display (LCD) or other suitable display device. Display system 770 receives textual and graphical information, and processes the information for output to the display device.

Peripherals devices 780 may include any type of computer support device to add additional functionality to the computer system. Peripheral device(s) 780 may include a modem or a router.

The components provided in the computer system 700 of FIG. 7 are those typically found in computer systems that may be suitable for use with embodiments of the present technology and are intended to represent a broad category of such computer components that are well known in the art. Thus, the computer system 700 of FIG. 7 may be a personal computer, hand held computing system, telephone, mobile computing system, workstation, server, minicomputer, mainframe computer, or any other computing system. The computer may also include different bus configurations, networked platforms, multi-processor platforms, etc. Various operating systems may be used including Unix, Linux, Windows, Macintosh OS, Palm OS, Android, iPhone OS and other suitable operating systems.

It is noteworthy that any hardware platform suitable for performing the processing described herein is suitable for use with the technology. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a CD-ROM disk, digital video disk (DVD), any other optical storage medium, RAM, PROM, EPROM, a FLASHEPROM, any other memory chip or cartridge.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as may be included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

The invention claimed is:

1. A method for managing an exchange that fulfills natural language travel requests via at least one processor, the method comprising:
   receiving, via a publishing module, a plurality of inventory records from a plurality of third-party suppliers of travel-related goods and services, each of the plurality of inventory records pertaining to an available offering, the available offering defined by a set of metadata attributes, wherein at least a portion of the metadata attributes are defined by the third-party supplier;
   receiving, via the at least one processor, from each of the plurality of third-party suppliers, one or more notification conditions to be notified about at least one natural language travel request associated with a customer, the one or more notification conditions including at least the set of metadata attributes and supplier preferences associated with an applicable customer profile;
   placing, via the publishing module, the plurality of inventory records in an inventory database, wherein each of the plurality of inventory records comprises an expiration date and a predetermined period of time for which the customer can place the available offering on hold;
   generating, via the at least one processor, equivalent phrases for the set of metadata attributes from each inventory record by applying pattern recognition artificial intelligence to value types of the set of metadata attributes, the equivalent phrases representing possible natural language travel query permutations for to which an inventory record may correspond, the pattern recognition artificial intelligence further comprising:
   determining a phraseology and keywords of each word of the natural language travel request, the keywords being in an artificial intelligence pattern recognition database,
      wherein the phraseology and keywords are utilized in combination for determining the equivalent phrases for itinerary components of the natural language travel request based at least in part on appropriate content categories identified by the combination of keywords and phraseology and equivalence class relationships, and
      wherein the equivalence class relationships are employed to infer potential equivalent phrases to the itinerary components of the natural language travel request based at least in part on the appropriate content categories and phraseology variations, accounting for spelling differences in the natural language travel request;
   upon occurrence of the expiration date of one of the plurality of inventory records, deleting, by the publishing module, from the inventory database, the one of the plurality of inventory records and the equivalent phrases associated with the one of the plurality of inventory records;
   upon termination of the predetermined period of time for which the customer can place the available offering on hold, returning the available offering to the inventory database, by the publishing module, if the available offering is not purchased by the customer;
   identifying, via the at least one processor utilizing the inferred potential equivalent phrases to the itinerary components from the pattern recognition artificial intelligence, the at least one natural language travel request that fulfills the one or more notification conditions associated with at least one of the plurality of third-party suppliers, wherein the customer associated with the at least one natural language travel request has the applicable customer profile; and
   sending, via the at least one processor, a notification about the at least one natural language travel request to the at least one of the plurality of third-party suppliers, the notification including the at least one natural language travel request and data associated with the applicable customer profile, the notification allowing the plurality of third-party suppliers to dynamically allocate inventory and dynamically price the inventory based on a set of consumer data and to draw inferences about the customer.

2. The method according to claim 1, further comprising parsing the plurality of inventory records to:
   evaluate the set of metadata attributes for each inventory record; and
   determine at least one category to associate with an inventory record based upon the set of metadata attributes of the inventory records.

3. The method according to claim 1, further comprising generating a new category for a set of metadata attributes of an inventory record when an association between an inventory record and at least one existing category cannot be determined.

4. The method according to claim 1, wherein equivalent phrases for inventory records are grouped into equivalent phrase classes, wherein the equivalent phrase classes are stored in an equivalent phrase class database within the artificial intelligence pattern recognition database.

5. The method according to claim 4, further comprising:
receiving a natural language search query;
applying semantic natural language parsing to the natural language search query to determine keywords and phraseology for the natural language search query;
comparing the keywords and phraseology to the equivalent phrase classes stored in the equivalent phrase class database; and
returning at least one inventory record that corresponds to the natural language search query when any of the keywords or phraseology substantially corresponds to at least one equivalent phrase.

6. The method according to claim 1, further comprising:
receiving a natural language search query that comprises a multifaceted travel itinerary;
determining itinerary components included in the natural language search query;
parsing the itinerary to generate categorized search request components;
constructing a multifaceted itinerary search request that includes at least a portion of the categorized search request components;
matching inventory records to the categorized search request components included in the multifaceted itinerary search request; and
returning at least one itinerary response that includes matching itinerary components.

7. The method according to claim 1, further comprising applying heuristic logic to the natural language search query to learn equivalent phrases for natural language search query when at least a portion of the natural language search query does not correspond to at least one of the generated equivalent phrases.

8. The method according to claim 1, further comprising determining dependencies for a metadata attribute, the dependency comprising at least one or more of a location dependency, a temporal dependency, a traveler preference dependency, or any combinations thereof.

9. A system for managing an exchange that fulfills natural language itinerary requests, the system comprising:
a memory for storing executable instructions;
a processor for executing the instructions to receive, from each of a plurality of third-party suppliers, one or more notification conditions to be notified about at least one natural language travel request associated with a customer, the one or more notification conditions including at least a set of metadata attributes and third-party supplier preferences associated with an applicable customer profile, to identify, via pattern recognition artificial intelligence, the at least one natural language travel request that fulfills the one or more notification conditions associated with at least one of the plurality of third-party suppliers, wherein the customer associated with the at least one natural language travel request has the applicable customer profile, and to send a notification about the at least one natural language travel request to the at least one of the plurality of third-party suppliers, the notification including the at least one natural language travel request and data associated with the applicable customer profile, the notification allowing the plurality of third-party suppliers to dynamically allocate inventory and dynamically price the inventory based on a set of consumer data and to draw inferences about the customer;
a publishing module stored in memory and executable by the processor to receive a plurality of inventory records from the plurality of third-party suppliers of travel-related goods and services, each of the plurality of inventory records pertaining to an available offering, the available offering being defined by the set of metadata attributes, wherein at least a portion of the metadata attributes are defined by the third-party supplier, to place the plurality of inventory records in an inventory database,
wherein each of the plurality of inventory records comprises:
an expiration date, and to delete, upon occurrence of the expiration date of one of the plurality of inventory records, from the inventory database, the one of the plurality of inventory records and equivalent phrases associated with the one of the plurality of inventory records, and
a predetermined period of time for which the customer can place the available offering on hold;
the publishing module returning the available offering to the inventory database if the available offering is not purchased by the customer upon termination of the predetermined period of time for which the customer can place the available offering on hold; and
a pattern recognition artificial intelligence engine stored in memory and executable by the processor to generate equivalent phrases for the set of metadata attributes from each inventory record by applying pattern recognition artificial intelligence to the set of metadata attributes, wherein the equivalent phrases representing possible natural language queries to which an inventory record may correspond are determined via the application of pattern recognition artificial intelligence that:
determines a phraseology and keywords of each word of the natural language travel request,
utilizes the phraseology and keywords in combination to determine appropriate content categories and equivalence class relationships, and
employs the equivalence class relationships to determine potential equivalent phrases to match inventory records, accounting for spelling differences in the natural language travel request.

10. The system according to claim 9, wherein the pattern recognition artificial intelligence engine further parses the plurality of inventory records to:
evaluate the set of metadata attributes for each inventory record; and
determine at least one category to associate with an inventory record based upon the set of metadata attributes of the inventory records.

11. The system according to claim 9, wherein the pattern recognition artificial intelligence engine further generates a new category for a set of metadata attributes of an inventory record when an association between an inventory record and at least one existing category cannot be determined.

12. The system according to claim 9, further comprising a search module stored in memory and executable by the processor to receive a natural language search query; and parse the natural language search query to determine keywords or phraseology for the natural language search query.

13. The system according to claim 12, wherein the pattern recognition artificial intelligence engine:
compares the parsed keywords and phraseology to equivalent phrases; and
returns at least one inventory record that corresponds to the natural language search query when any of the keywords or phraseology substantially corresponds to at least one equivalent phrase.

14. The system according to claim 9, further comprising a search module that:
   receives a natural language search query that comprises a multifaceted travel itinerary;
   determines itinerary components included in the natural language search query; and
   constructs a multifaceted itinerary search request that includes at least a portion of the categorized search request components.

15. The system according to claim 14, wherein the pattern recognition artificial intelligence engine:
   matches inventory records to the categorized search request components included in the multifaceted itinerary search request; and
   returns at least one itinerary response that includes matching itinerary components.

* * * * *